United States Patent
Rencher et al.

(10) Patent No.: US 9,788,085 B2
(45) Date of Patent: Oct. 10, 2017

(54) SYSTEM AND METHOD OF DETERMINING NETWORK LOCATIONS FOR DATA ANALYSIS IN A DISTRIBUTED ECOSYSTEM

(71) Applicant: The Boeing Company, Chicago, IL (US)

(72) Inventors: Robert J. Rencher, Normandy Park, WA (US); Guijun Wang, Issaquah, WA (US); Haiqin Wang, Redmond, WA (US); Sharon F. Arroyo, Sammamish, WA (US); Paul J. Schachter, Seattle, WA (US); David Nelson, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 233 days.

(21) Appl. No.: 14/699,276

(22) Filed: Apr. 29, 2015

(65) Prior Publication Data
US 2016/0323198 A1 Nov. 3, 2016

(51) Int. Cl.
*H04Q 9/00* (2006.01)
*H04L 12/911* (2013.01)
(Continued)

(52) U.S. Cl.
CPC ............... *H04Q 9/00* (2013.01); *G06F 9/50* (2013.01); *H04L 47/74* (2013.01); *H04L 67/12* (2013.01); *H04W 84/18* (2013.01)

(58) Field of Classification Search
CPC .... G06Q 10/06; A61B 5/0002; A61B 5/0024; A61B 5/11; A61B 5/14546; A61B 5/411;
(Continued)

(56) References Cited

U.S. PATENT DOCUMENTS 6,449,588 B1   9/2002   Bowman-Amuah
7,185,084 B2   2/2007   Sirivara et al.
(Continued)

OTHER PUBLICATIONS

Armbrust, M., Fox, A., Griffith, R., Joseph, A.D., Katz, R., Konwinski, A., et al.; "A View of Cloud Computing"; Communications of the ACM, 53(4), pp. 50-58 (Apr. 2010).
(Continued)

*Primary Examiner* — Wing F Chan
*Assistant Examiner* — Raji Krishnan
(74) *Attorney, Agent, or Firm* — Thompson Hine LLP

(57) ABSTRACT

A distributed ecosystem including an analysis computing resource and a network is disclosed. The distributed ecosystem also includes at least one sensor for monitoring a characteristic of the distributed ecosystem, at least one localized computing resource in communication with the at least one sensor, and a gateway controller. The gateway controller is in communication with the at least one sensor, the at least one localized computing resource, and the analysis computing resource. The gateway control includes control logic for monitoring the at least one sensor for a data transmit function. The gateway controller also includes control logic for determining if the at least one localized computing resource has requisite resource capabilities for processing data generated by the at least one sensor in response to the data transmit function being transmitted by the at least one sensor.

20 Claims, 4 Drawing Sheets

(51) Int. Cl.
*G06F 9/50* (2006.01)
*H04L 29/08* (2006.01)
*H04W 84/18* (2009.01)

(58) Field of Classification Search
CPC ......... A61B 5/415; A61B 5/418; A61B 5/486; H04N 7/147–7/188; H04L 67/02; H04L 67/025; H04L 67/10; H04W 4/028
See application file for complete search history.

(56) References Cited

U.S. PATENT DOCUMENTS

| | | | | |
|---|---|---|---|---|
| 8,707,316 | B1* | 4/2014 | Wang | G06F 17/5013 705/7.12 |
| 2004/0103189 | A1 | 5/2004 | Cherkasova et al. | |
| 2005/0021742 | A1 | 1/2005 | Yemini et al. | |
| 2007/0027367 | A1* | 2/2007 | Oliver | A61B 5/0002 600/300 |
| 2008/0146892 | A1* | 6/2008 | LeBoeuf | A61B 5/486 600/300 |
| 2012/0005236 | A1 | 1/2012 | Deng et al. | |
| 2013/0013284 | A1* | 1/2013 | Wang | G06Q 10/06 703/22 |
| 2013/0138271 | A1* | 5/2013 | Danielsson | H04L 67/322 701/3 |
| 2013/0304385 | A1* | 11/2013 | Gillette, II | G01N 33/0009 702/6 |
| 2014/0115592 | A1* | 4/2014 | Frean | G06F 9/5027 718/102 |
| 2014/0195664 | A1* | 7/2014 | Rahnama | G06F 17/30528 709/223 |
| 2015/0063202 | A1* | 3/2015 | Mazzarella | H04B 7/18504 370/316 |
| 2015/0215173 | A1* | 7/2015 | Dutta | G06F 9/505 709/226 |
| 2016/0012340 | A1* | 1/2016 | Georgescu | G05B 15/02 700/276 |
| 2017/0148293 | A1* | 5/2017 | Rasband | G08B 13/2491 |

OTHER PUBLICATIONS

Buyya, R., Ranjan, R., & Calheiros, R.; "Modeling and Simulation of Scalable Cloud Computing Environments and the CloudSim Toolkit: Challenges and Opportunities"; International Conference on High Performance Computing & Simulation (HPCS); pp. 1-11 (Jun. 21-24, 2009).

Ganapathi, A.S., Chen, Y., Fox, A., Katz, R. H., & Patterson, D.A.; "Statistics-Driven Workload Modeling for the Cloud"; Workshop on Self-Managing Database Systems (SMDB); pp. 1-19 (2010).

Barford, P. et al.; Chapter 1, "Cyber SA Situational Awareness for Cyber Defence"; S. Jajodia et al., (eds.), Cyber Situational Awareness; Springer Science+Business Media, LLC; pp. 3-13 (2010).

Ko, J. M., Kim, C. O., & Kwon I. H.; "Quality-of-Service Oriented Web Service Composition Algorithm and Planning Architecture"; The Journal of Systems and Software, 81, pp. 2079-2090 (2008).

Li, Luqun; "An Optimistic Differentiated Service Job Scheduling System for Cloud Computing Service Users and Providers"; Third International Conference on Multimedia and Ubiquitous Engineering; IEEE Computer Society; pp. 295-299 (2009).

Wada, H., Suzuki, J., & Oba, K., "Queuing Theoretic and Evolutionary Deployment Optimization with Probabilistic SLAs for Service Oriented Clouds"; IEEE ICWS International Workshop on Cloud Services, Los Angeles, CA; pp. 1-9 (Jul. 6-10, 2009).

Xiong, K., & Perros, H.; "Service Performance Analysis in Cloud Computing"; IEEE Congress on Services-I, pp. 693-700 (Jul. 6-10, 2009).

U.S., Non-Final Office Action; U.S. Appl. No. 13/176,236 (dated Jan. 27, 2014).

U.S., Final Office Action; U.S. Appl. No. 13/176,236 (dated Aug. 26, 2014).

U.S., Non-Final Office Action; U.S. Appl. No. 13/176,236 (dated Jan. 15, 2015).

* cited by examiner

SYSTEM AND METHOD OF DETERMINING NETWORK LOCATIONS FOR DATA ANALYSIS IN A DISTRIBUTED ECOSYSTEM

FIELD

The disclosed system relates to a system and method of determining network locations in a distributed ecosystem and, more particularly, to a system and method of determining at least one ideal network location for analyzing data, performing decision making tasks, and providing deterministic guidance in a distributed ecosystem.

BACKGROUND

A highly distributed ecosystem may be a complex information system having a logically defined mesh of computing resources. The computing resources may be controlled by logical constructs that obtain, disseminate, process, and prepare information in useful forms for both machine as well as human consumption. The distributed ecosystems that are currently available typically utilize a centralized, monolithic approach to perform analysis and decision making tasks. That is, in other words, the distributed ecosystems that are currently available usually include a centralized process point or computing resource that performs analysis and decision making tasks for the entire distributed ecosystem.

The current approach for performing analysis and decision making tasks in a distributed ecosystem could be improved in order to better meet the dynamic nature of distributed analytics. For example, data needs to be transmitted to the centralized computing resource of the highly distributed ecosystem first before any analysis or decision making may be performed with the current approach. Therefore, there is time involved in transporting data from the location of origin to the analysis location (i.e., the centralized computing resource) and the business continuity challenge of sustaining centralized computing resources. In some instances, it may actually be less time consuming for the data to be analyzed in another location than the centralized computing resource. Thus, there exists a continuing need in the art for an improved approach for analyzing data and performing decision making tasks in a highly distributed ecosystem.

SUMMARY

In one aspect, a distributed ecosystem including an analysis computing resource and a network is disclosed. The distributed ecosystem also includes at least one sensor for monitoring a characteristic of the distributed ecosystem, at least one localized computing resource in communication with the at least one sensor, and a gateway controller. The gateway controller is in communication with the at least one sensor, the at least one localized computing resource, and the analysis computing resource. The gateway control includes control logic for monitoring the at least one sensor for a data transmit function. The gateway controller also includes control logic for determining if the at least one localized computing resource has requisite resource capabilities for processing data generated by the at least one sensor in response to the data transmit function being transmitted by the at least one sensor. The gateway controller also includes control logic for transmitting the data generated by the at least one sensor over the network to the analysis computing resource in response to determining the at least one localized computing resource does not have the requisite resource capabilities.

In another aspect, a method of determining at least one ideal network location for analyzing data, performing decision making tasks, and guidance determination in a distributed ecosystem is disclosed. The method includes monitoring at least one sensor by a gateway controller for a data transmit function. The gateway controller is in communication with the at least one sensor, at least one localized computing resource, and an analysis computing resource. The method also includes determining if the at least one localized computing resource has requisite resource capabilities for processing data generated by the at least one sensor by the gateway controller in response to the data transmit function being transmitted by the at least one sensor. The method also includes transmitting the data generated by the at least one sensor over the network to the analysis computing resource by the gateway controller in response to determining the at least one localized computing resource does not have the requisite resource capabilities.

Other objects and advantages of the disclosed method and system will be apparent from the following description, the accompanying drawings and the appended claims.

DETAILED DESCRIPTION

Figure 1:
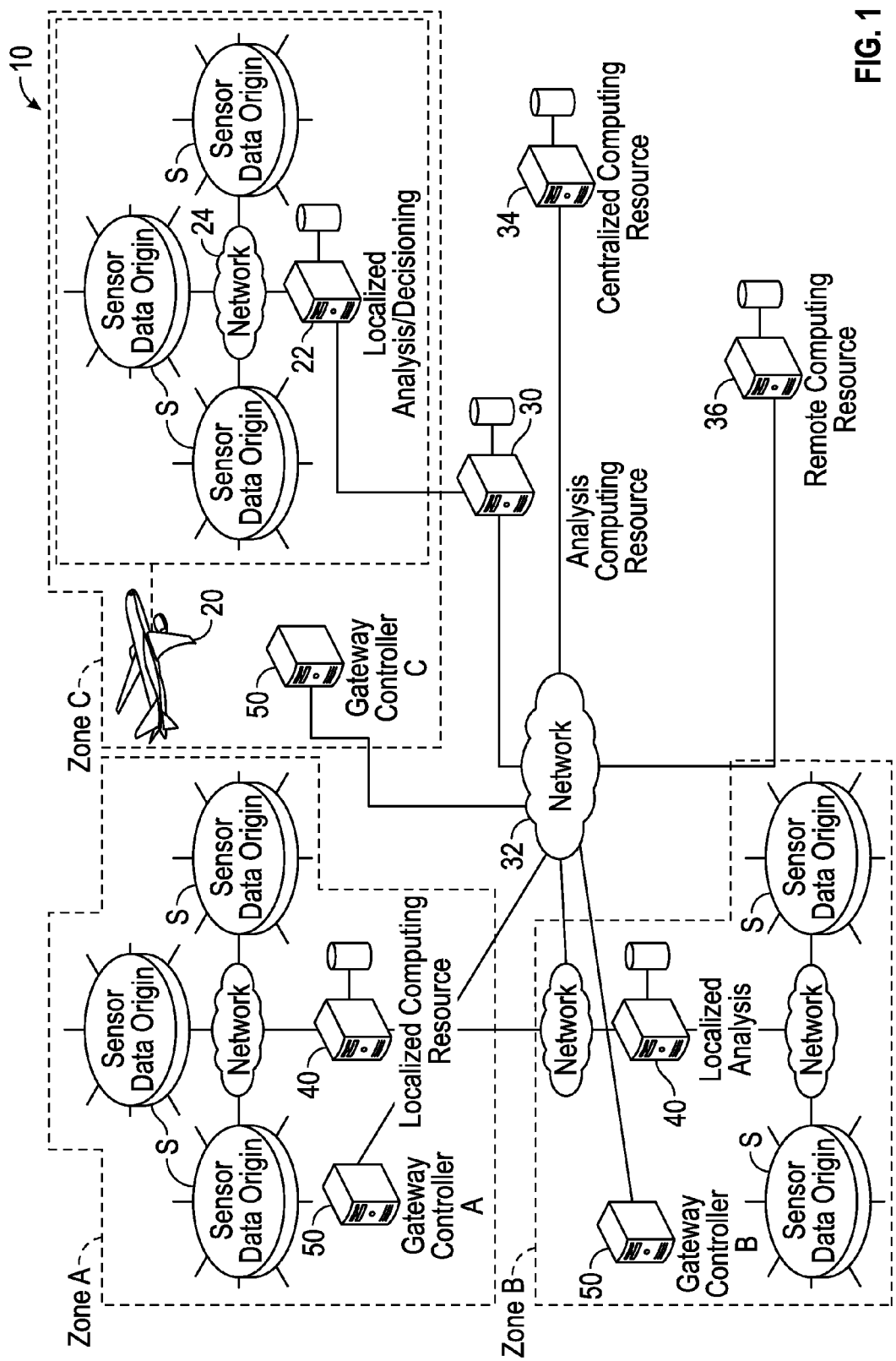
FIG. 1 is an illustration of an exemplary distributed ecosystem in an aviation application.

FIG. 1 is an exemplary illustration of the disclosed distributed ecosystem 10 based on an aviation application. In the embodiment as shown in FIG. 1, the distributed ecosystem 10 may include an aircraft 20. The aircraft 20 may include an on-board localized computing resource 22 for analysis and decision making tasks. The localized computing resource 22 may be connected to a local network 24, where the local network 24 connects the localized computing resource 22 to a plurality of sensors S. The sensors S may be used to monitor operating conditions of the aircraft 20 such as, for example, temperature, humidity, speed, and pressure. It is to be understood that while the distributed ecosystem 10 shown in FIG. 1 is utilized in an aviation application, this illustration is merely exemplary in nature. Those of ordinary skill in the art will readily appreciate that the present disclosure should not be limited to the illustrated aviation application. For example, the distributed ecosystem 10 may be used in a variety of other industrial applications such as, but not limited to, manufacturing applications and other transportation-based applications.

The distributed ecosystem 10 may also include an analysis computing resource 30 in communication with the localized computing resource 22 of the aircraft 20 though a centralized network 32. The centralized network 32 also connects the analysis computing resource 30, a centralized computing resource 34, a remote computing resource 36, and one or more localized computing resources 40 with one another such that all of the computing resources within the distributed ecosystem 10 are in communication and may exchange data with one another. As seen in FIG. 1, the localized computing resources 40 may each be in communication with one or more sensors S. The distributed ecosystem 10 may also include one or more gateway controllers 50, which are also in communication with the centralized network 32. As explained in greater detail below, the gateway controllers 50 determine if data generated by the sensors S should be analyzed by one of the localized computing resources 40, or if the data should be sent to another location within the distributed ecosystem 10 for analysis and decision making tasks.

In the embodiment as shown in FIG. 1, the localized computing resource 22 of the aircraft 20, the analysis computing resource 30, the centralized computing resource 34, the remote computing resource 36, the localized computing resources 40 and the gateway controllers 50 are each illustrated as a single physical computing resource. However, it is to be understood that these computing resources may each include multiple physical computing devices that are considered a single resource by the distributed ecosystem 10. As explained in greater detail below, the disclosed distributed ecosystem 10 may select one or more ideal network locations to analyze sensor data, make decisions based on the analysis of the sensor data, and also provide deterministic guidance.

For purposes of the present disclosure, the local network 24 within the aircraft 20 and the network 32 may be any type of wired or wireless communication approach where the sensors S, the localized computing resource 22, the analysis computing resource 30, the centralized computing resource 34, the remote computing resource 36, the localized computing resources 40, and the gateway controllers 50 may each be securely and uniquely identified, and may transmit and receive data with one another. The sensors S may monitor any characteristic of the distributed ecosystem 10 such as, for example, barometric pressure, motion, or temperature. It is to be understood that the type and function of the sensors S are not significant to the present disclosure. The sensors S should have network connectivity at the time of data generation, however intermittent connectively is also contemplated as well. Those of ordinary skill in the art will readily appreciate that persistent connectivity of the sensors S is only a requirement while the sensors S are actually generating signals.

The sensors S may monitor a specific characteristic of the distributed ecosystem 10, and generate a data signal indicative of the specific characteristic being monitored. The sensors S may continue to monitor a specific characteristic of the distributed ecosystem 10 until a data transmit function is triggered. In response to the data transmit function being triggered, a respective sensor S may transmit a data signal indicative of the specific characteristic being monitored over the network 32. In one approach, the data transmit function may be based upon an exception event occurring. The exception event indicates the sensor S has detected operating conditions within the distributed ecosystem 10 that require analysis. Specifically, the exception event indicates the conditions being monitored by the respective sensor S are not within an expected pattern, or fall outside of an acceptable range of operation. Alternatively, in another embodiment, the data transmit function may be periodically triggered. This means that the sensors S send data signals indicative of the specific characteristic being monitored over the network 32 regardless of the specific operating conditions detected by the sensors S.

In one embodiment, the sensors S may be smart sensors that include a processor (not illustrated) to determine the data transmit function. Specifically, in one embodiment the processor (not illustrated) of each sensor S may include control logic or circuitry that defines a deterministic process for determining if an exception event that warrants a transmission of data over the network 32 has occurred. Alternatively, in another approach the sensors S may receive external instructions generated by another computing resource located within the distributed ecosystem 10 (e.g., the gateway controllers 50). The instructions indicate the data transmit function should be initiated by the sensors S. It is to be understood that each of the sensors S of the distributed ecosystem 10 should be secure and uniquely addressable.

Figure 2:
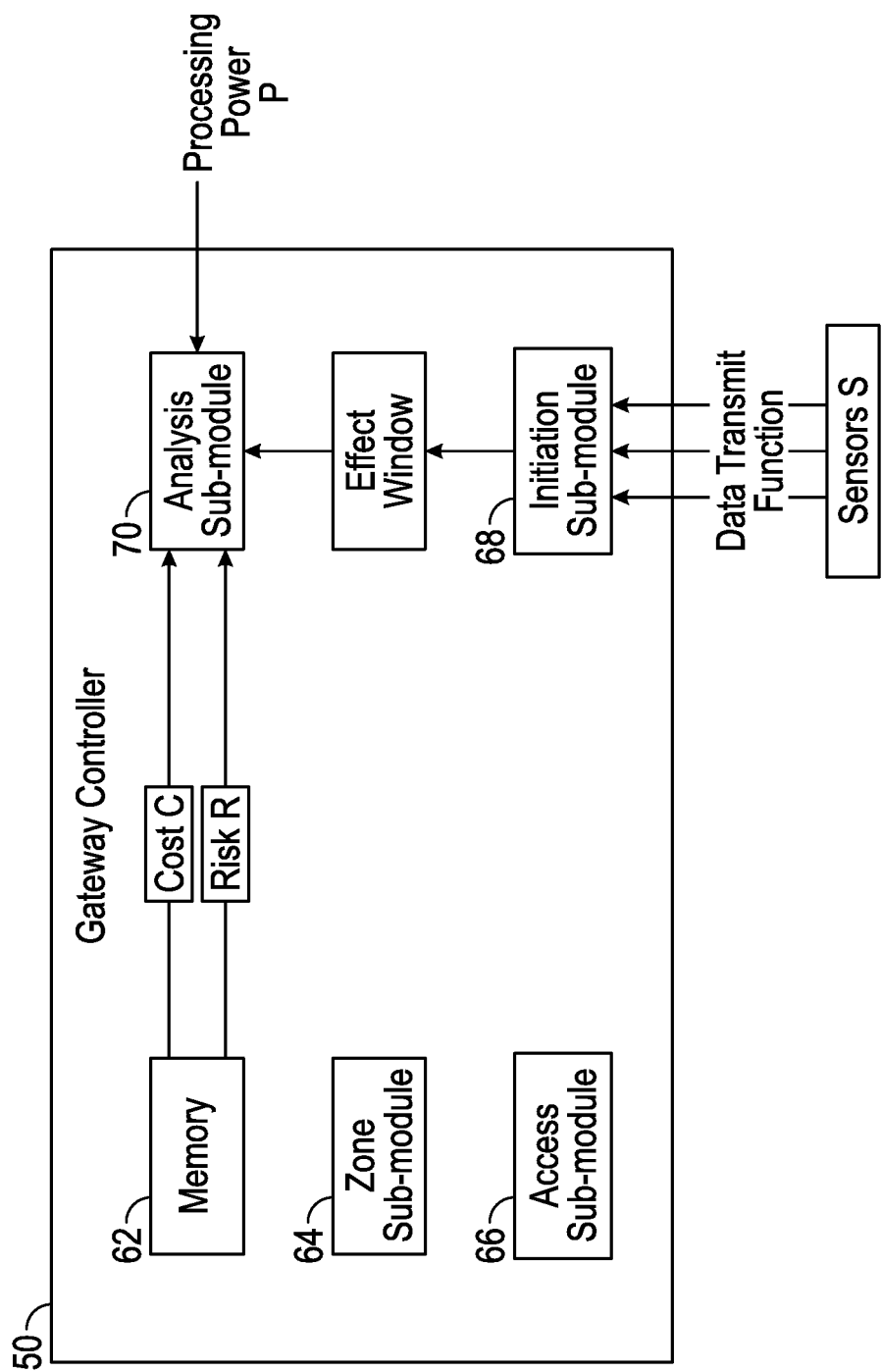
FIG. 2 is an exemplary block diagram of a gateway controller shown in FIG. 1 according to an embodiment of the disclosure.

Referring to FIGS. 1 and 2, the gateway controllers 50 may be any mobile or tethered computing device, and may refer to, or be part of, an application specific integrated circuit (ASIC), an electronic circuit, a combinational logic circuit, a field programmable gate array (FPGA), a processor (shared, dedicated, or group) comprising hardware or software that executes code, or a combination of some or all of the above, such as in a system-on-chip. As seen in FIG. 2 and described in greater detail below, the gateway controllers 50 may each include a plurality of sub-modules and control logic for analyzing and processing data.

Turning back to FIG. 1, the gateway controllers 50 may each be assigned to a zone of operation within the distributed ecosystem 10. The zone of operation may be a defined set of sensors S and network components that are monitored and analyzed by a specific one of the gateway controllers 50. As explained in greater detail below, the gateway controller 50 may monitor the respective sensors S for the data transmit function, and determines if the data generated by the sensors S should be analyzed locally by a corresponding localized computing resource, or if the data should be sent to another location within the distributed ecosystem 10 for analysis and decision making tasks.

Analysis of the data generated by the sensors S may incorporate not only the sensor data itself, but also data from other sources such as, for example, weather data, air traffic control data, airline operation data, or other aircraft sensors (not shown) located in other zones. Analysis of the data generated by the sensors S may involve determining the cause of the exception event, if applicable. The analysis of the data may also include generating decisions and recommendations regarding operation of the distributed ecosystem 10 based upon the data collected by the sensors S. Once the decisions and recommendations have been determined by the appropriate computing resource of the distributed ecosystem 10, then deterministic guidance may be provided based on the respective decisions and recommendations. Deterministic guidance is deterministic in terms of actions required within a time window and may include machine guidance, human guidance, and/or data communication to the relevant sensors S. Machine guidance may include instructions or data for operating a specific computing resource or resources. Human guidance may be communicated to a user of the distributed ecosystem 10 using an interface (not illustrated). The interface may be, for example, a visual interface such as an electronic visual display, a sensory feedback mechanism (e.g., vibration) or an audio interface such as a speaker.

In the exemplary embodiment as shown in FIG. 1, the gateway controller A determines if a respective localized computing resource 40 has the requisite resource capabilities (i.e., processing power) for analyzing and making decisions based on the data generated by the respective sensors S within the zone A. It is to be understood that determination of the requisite resource capabilities also includes determining if sufficient data is available, where the need for additional data may be determined by rules based logic of the gateway controller A. Zone A includes the gateway controller A, a specific localized computing resource 40, and the sensors S in communication with the specific localized computing resources 40. Similarly, the gateway controller B determines if a specific localized computing resource 40 has the requisite resource capabilities for analyzing and making decisions based on the data generated by the respective sensors S within the zone B. Also, the gateway controller C determines the if the localized computing resource 22 has the requisite resource capabilities for analyzing and making decisions based on the data generated by the respective sensors S within the zone C.

It is to be understood that the zones A, B, and C are dynamic. This means that the actual computing resources and sensors S included within each zone may change depending on the specific application. Specifically, the computing resources and sensors S included within each zone may be determined by a process or processes associated with a unit of work. A unit of work is a predetermined set of tasks relative to defined activities within a respective zone.

Although FIG. 1 illustrates three gateway controllers A, B, and C, it is to be understood that this illustration is merely exemplary in nature and the disclosure should not be limited to only three gateway controllers 50 within the distributed ecosystem 10. It should also be understood that the gateway controllers 50 may communicate with one another over the network 32. It is also understood that the centralized computing resource 34 as well as the remote computing resource 36 both do not participate in a defined zone. In other words, the centralized computing resource 34 as well as the remote computing resource 36 are not part of zones A, B, or C, and are not part of another unique zone within the distributed ecosystem 10. This is because a specific zone (e.g., zones A, B and C) should include a defined set of sensors, and neither the centralized computing resource 34 or the remote computing resource 36 are in direct communication with any sensors S located within the distributed ecosystem 10.

Continuing to refer to FIG. 1, the remote computing resource 36 may include one or more physical computing devices that are treated as a single resource by the analysis computing resource 30. The purpose of the remote computing device 36 is to separate analysis and decision making from the operational environment (i.e., the environment where the sensors S are located). The centralized computing resource 34 may also include one or more physical computing devices treated as a single resource, and perform similar analysis and decision making as the remote computing resource 36. However, the centralized computing resource 34 may have lower operational costs and increased performance parameters when compared to the remote computing resource 36. Thus, the centralized computing resource 34 may be used in applications where relatively large data sets and complex algorithms are involved, which are similar to the types of activities found in high performance computing environments (also be referred to as a supercomputer).

The analysis computing resource 30 may include information regarding costs and risks stored in memory. The costs and risks may be indicative of the costs and risks associated with analyzing the data generated by the respective sensors S by the centralized computing resource 34, the remote computing resource 36, and both the centralized computing resource 34 and the remote computing resource 36 combined. In one embodiment, the risks represents the chance the centralized computing resource 34, the remote computing resource 36, and both the centralized computing resource 34 and the remote computing resource 36 may not be able to complete analysis of the data within the time allotted by the effect window. The costs are based on time and resource consumption of the centralized computing resource 34, the remote computing resource 36, and both the centralized computing resource 34 and the remote computing resource 36 combined together analyzing the data generated by the respective sensors S.

The gateway controllers 50 each perform a pre-analysis. Pre-analysis involves having the gateway controllers 50 each monitor the respective sensors S to determine if the exception event has occurred, thereby warranting the transmission of data. In other words, the gateway controllers 50 monitor the respective sensors S for the data transmit function. In response to receiving the data transmit function, the gateway controllers 50 may each determine if the respective localized computing resources 22, 40 have the requisite resource capabilities for analyzing the data generated by the respective sensors S within a defined period of time, which is referred to as an effect window.

The effect window may be a set amount of time allotted for performing the analysis of the data generated by the respective sensors S through the data transmit function. Those of ordinary skill in the art will appreciate that the effect window may vary based on the specific application and type of data being generated. Specifically, some types of data, such as data indicating an emergency event, may require a substantially shorter effect window than data indicating a non-emergency event. For example, the gateway controller A may receive the data transmit function indicating the sensors S within zone A have detected conditions that fall outside the acceptable range of operation. In response to receiving the data transmit function, the gateway controller A may determine if the localized computing resource 40 located within zone A has the requisite resource capabilities for analyzing the data generated by the sensors S within a specific effect window.

In the present example, the effect window may be about thirty seconds. If the localized computing resource 40 located within zone A has the required resource capabilities for analyzing and making decisions based on the data generated by the sensors S within thirty seconds, then the gateway controller A allows for the localized computing resource 40 located within zone A to analyze the data. However, if the localized computing resource 40 located within zone A does not have the required resource capabilities for analyzing the data generated by the sensors 42 within thirty seconds, then the gateway controller A may send a notification over the network 32 to the analysis computing resource 30. The gateway controller A may also transmit the data collected by the sensors S over the network 32 to the analysis computing resource 30.

Referring to FIG. 2, each gateway controller 50 may include a memory 62, a zone sub-module 64, an access sub-module 66, an initiation sub-module 68, and an analysis sub-module 70. The gateway controllers 50 may each be a multi-functional device that determines if the respective localized computing resource within the respective zone has the requisite resource capabilities to analyze the data generated by the respective sensors. Referring to both FIGS. 1 and 2, the zone sub-module 64 defines a logical definition or representation of the respective sensors S within a specific zone. The logical representation of the respective sensors S may include sensor information such as, for example, information including the sensor type, data generation profile, physical location, network address, data of installation, and utilization pattern profiles (used for security reasons). The logical representation may be stored within a database (not illustrated in the figures) within the distributed ecosystem 10.

The access sub-module 66 provides security and access controls for the respective zone. Specifically, the access sub-module 66 controls access to the respective zone, provides authorization to data generated within the respective zone, and also provides authorization to perform tasks and processes within the respective zone. The access sub-module 66 provides security and access control for the devices located within the zone, including the respective sensors S as well as the respective computing resources. The access sub-module 66 may also provide access control that limits control and function of the devices within the respective zone of operation as well. Access control allows for various computing devices located within the distributed ecosystem 10 to act upon the devices located within the respective zone.

The initiation sub-module 68 monitors the respective sensors S within the respective zone of operation, and responds to the data transmit function generated by one or more of the sensors S located within the respective zone. Specifically, the initiation sub-module 68 responds to the data transmit function generated by one or more of the respective sensors S by determining a set of event determination parameters. The event determination parameters determine the effect window (i.e., the amount of time allotted for performing the analysis of the data generated by the sensors S). The event determination parameters are based upon an operational scope of the respective sensors S. The operational scope is a function of the frequency cycle of the sensor. For example, a barometric pressure sensor's operational scope may be defined by the function of measuring barometric pressure about every 3 seconds.

The analysis sub-module 70 of each gateway controller 50 determines if the respective localized computing resource 22, 40 within the respective zone has the requisite resource capabilities to process the data generated by the respective sensors S based on several factors. First, the analysis sub-module 70 receives as input the effect window determined by the initiation sub-module 68. The analysis sub-module 70 also receives as input a signal P indicative of the current processing power of the respective localized computing resource 22, 40. The analysis sub-module 70 further receives as input a cost C and risk R that may be stored in the memory 62 of the gateway controller 50.

The cost C and risk R may be indicative of the costs and risks associated with analyzing the data generated by the respective sensors S by the respective localized computing resource 22, 40. In one embodiment, the risk R represents the chance or risk that the respective localized computing resource may not be able to complete analysis of the data within the time allotted by the effect window. The cost C is based on time and resource consumption of the localized computing resource 22, 40 analyzing the data generated by the respective sensors S. The analysis sub-module 70 may then determine if the respective localized computing resource 22, 40 has the requisite resource capabilities to analyze data within the effect window based on the processing power of the respective localized computing resource 22, 40, the cost C, and the risk R.

If the gateway controller 50 determines that the localized computing resource 22, 40 within the respective zone has the requisite resource capabilities to analyze the data generated by the respective sensors S, then localized analysis may occur. Specifically, localized analysis involves the respective localized computing resource 22, 40 analyze sensor data, perform decision making tasks based on the sensor data, and provide deterministic guidance based on the decision making tasks. It is to be understood that the localized analysis performed by a single gateway controller 50 may occur autonomously from the remaining devices and computing resources located within the distributed ecosystem 10. Also, the analysis computing resource 30 may be notified over the network 32 when the localized analysis begins and ends.

In one embodiment, localized analysis may further include having the localized computing resource 22, 40 evaluate the constraints and the performance parameters of the resources (i.e., all of the computing devices and sensors S) within the respective zone. The localized computing resource 22, 40 may then determine which resources within the respective zone may be used to perform the localized analysis.

If the gateway controller 50 determines that the localized computing resource 22, 40 within the respective zone does not have the requisite resource capabilities to analyze the data generated by the respective sensors S, then the data generated by the sensors S, the cost C, the risk R, and the effect window are sent to the analysis computing resource 30 over the network 32. In response to receiving the data over the network 32, the analysis computing resource 30 may then select one or more computing resources within the distributed ecosystem 10 to perform analysis, decision making tasks, and deterministic guidance. Specifically, the analysis computing resource 30 may select the centralized computing resource 34, the remote computing resource 36, or both the centralized computing resource 34 and the remote computing resource 36 for analyzing sensor data, performing decision making tasks based on the sensor data, and providing deterministic guidance based on the decision making tasks.

The selection of the centralized computing resource 34, the remote computing resource 36, or both the centralized computing resource 34 and the remote computing resource 36 may be based on the risk R that a specific one of the computing resource or resources may not be able to complete analysis of the data within the time allotted by the effect window. The selection may also be based on the cost C of the resource consumption of the specific computing device within the distributed ecosystem 10. For example, in one approach the analysis computing resource 30 may determine the centralized computing resource 34 provides less risk and lower cost to perform analysis, decision making tasks, and deterministic guidance when compared to the remote computing resource 36. The analysis computing resource 30 may also determine that the centralized computing resource 34 has the requisite resource capabilities (i.e. processing power) for analyzing and making decisions, and performing deterministic guidance for the sensor data within the effect window. Thus, the analysis computing resource 30 may select the centralized computing resource 34.

Referring generally to FIGS. 1 and 2, the disclosed distributed ecosystem 10 as explained above provides a decentralized approach for efficiently acquiring sensor data, and allows for analysis and decision making to occur within the effect window. The disclosed distributed ecosystem 10 determines at least one ideal network location for analyzing data, performing decision making tasks, and providing deterministic guidance, which in turn may result in a decreased amount of time to perform analysis, improves the quality of the decisions made, and also reduces cost and time delays. Moreover, a user's time may also be more efficiently used as well, since the disclosed distributed ecosystem 10 may result in a decreased amount of time required to perform analysis and decision making.

Figure 3:
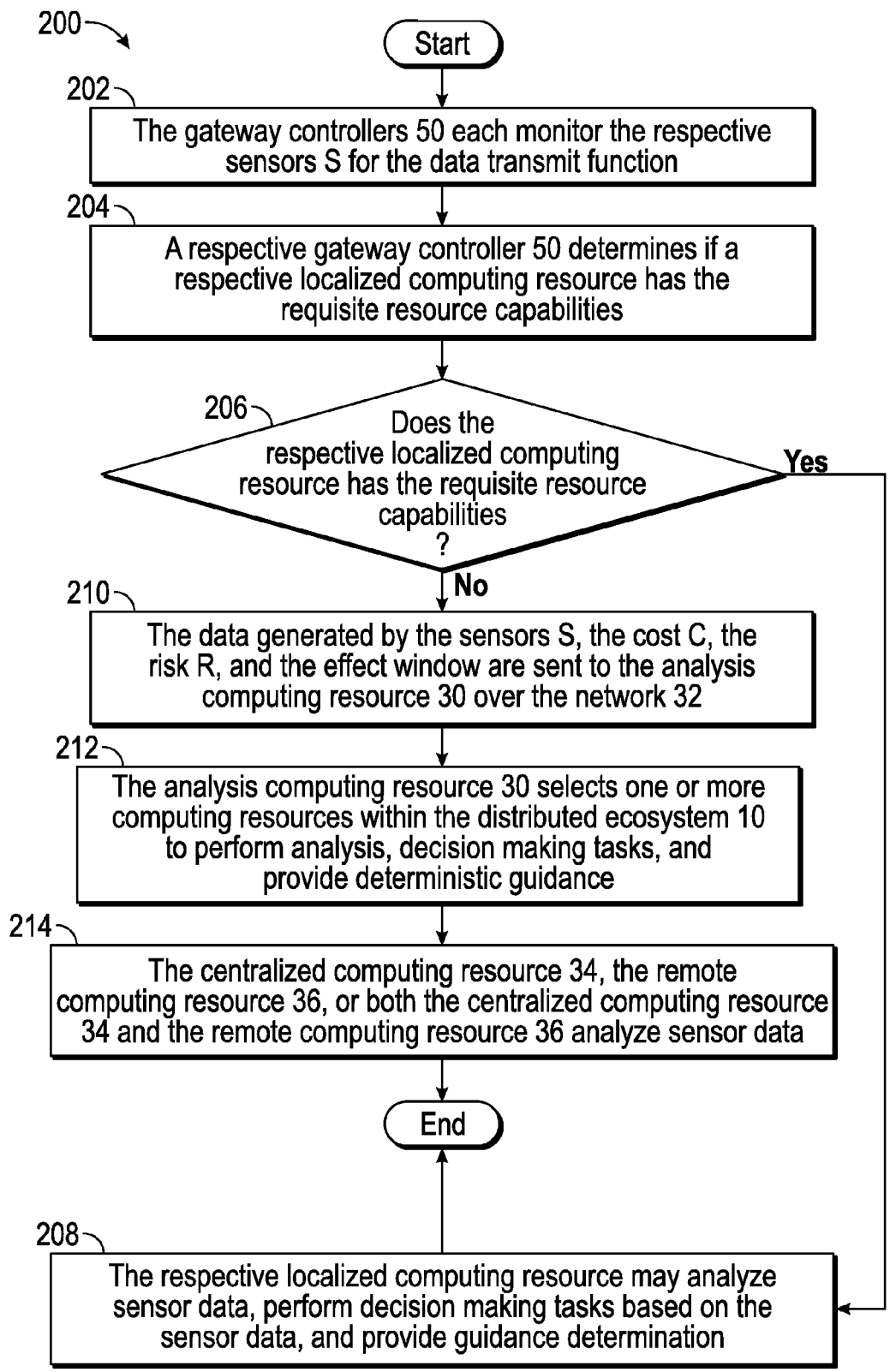
FIG. 3 is an exemplary process flow diagram illustrating a method of selecting at least one ideal network location within the distributed ecosystem.

FIG. 3 is a process flow diagram illustrating an exemplary method 200 of selecting at least one ideal network location for analyzing data, performing decision making tasks, and deterministic guidance within the distributed ecosystem 10. Referring generally to FIGS. 1-3, the method 200 may begin at block 202. In block 202, the gateway controllers 50 each monitor the respective sensors S for the data transmit function. In response to at least one of the sensors S located in zone A, zone, B, or zone C of the distributed ecosystem 10 generating the data transmit function, method 200 may proceed to block 204.

In block 204, in response to receiving the data transmit function, a respective gateway controller 50 determines if a respective localized computing resource has the requisite resource capabilities for analyzing the data generated by the respective sensor or sensors S within the effect window. Referring to FIG. 2, the gateway controller 50 makes the determination based on the data generated by the sensors S, the cost C, the risk R, and the effect window. Method 200 may then proceed to decision block 206.

In decision block 206, if the respective gateway controller 50 determines the respective localized computing resource has the requisite resource capabilities for analyzing the data generated by the respective sensor or sensors S within the effect window, then method 200 may proceed to block 208. In block 208, the respective localized computing resource may analyze sensor data, perform decision making tasks based on the sensor data, and provide deterministic guidance based on the decision making tasks. Method 200 may then terminate, or return to block 202.

Referring back to decision block 206, if the respective gateway controller 50 determines the respective localized computing resource 22, 40 does not have the requisite resource capabilities for analyzing the data generated by the respective sensor or sensors S within the effect window, then method 200 may proceed to block 210. In block 210, the data generated by the sensors S, the cost C, the risk R, and the effect window are sent to the analysis computing resource 30 over the network 32. Method 200 may then proceed to block 212.

In block 212, the analysis computing resource 30 selects one or more computing resources within the distributed ecosystem 10 to perform analysis, decision making tasks, and deterministic guidance. Specifically, the analysis computing resource 30 may select the centralized computing resource 34, the remote computing resource 36, or both the centralized computing resource 34 and the remote computing resource 36 for analyzing sensor data, performing decision making tasks based on the sensor data, and providing deterministic guidance based on the decision making tasks. Method 200 may then proceed to block 214.

In block 214, the centralized computing resource 34, the remote computing resource 36, or both the centralized computing resource 34 and the remote computing resource 36 analyze sensor data, perform decision making tasks based on the sensor data, and provide deterministic guidance based on the decision making tasks. Method 200 may then terminate, or return to block 202.

Figure 4:
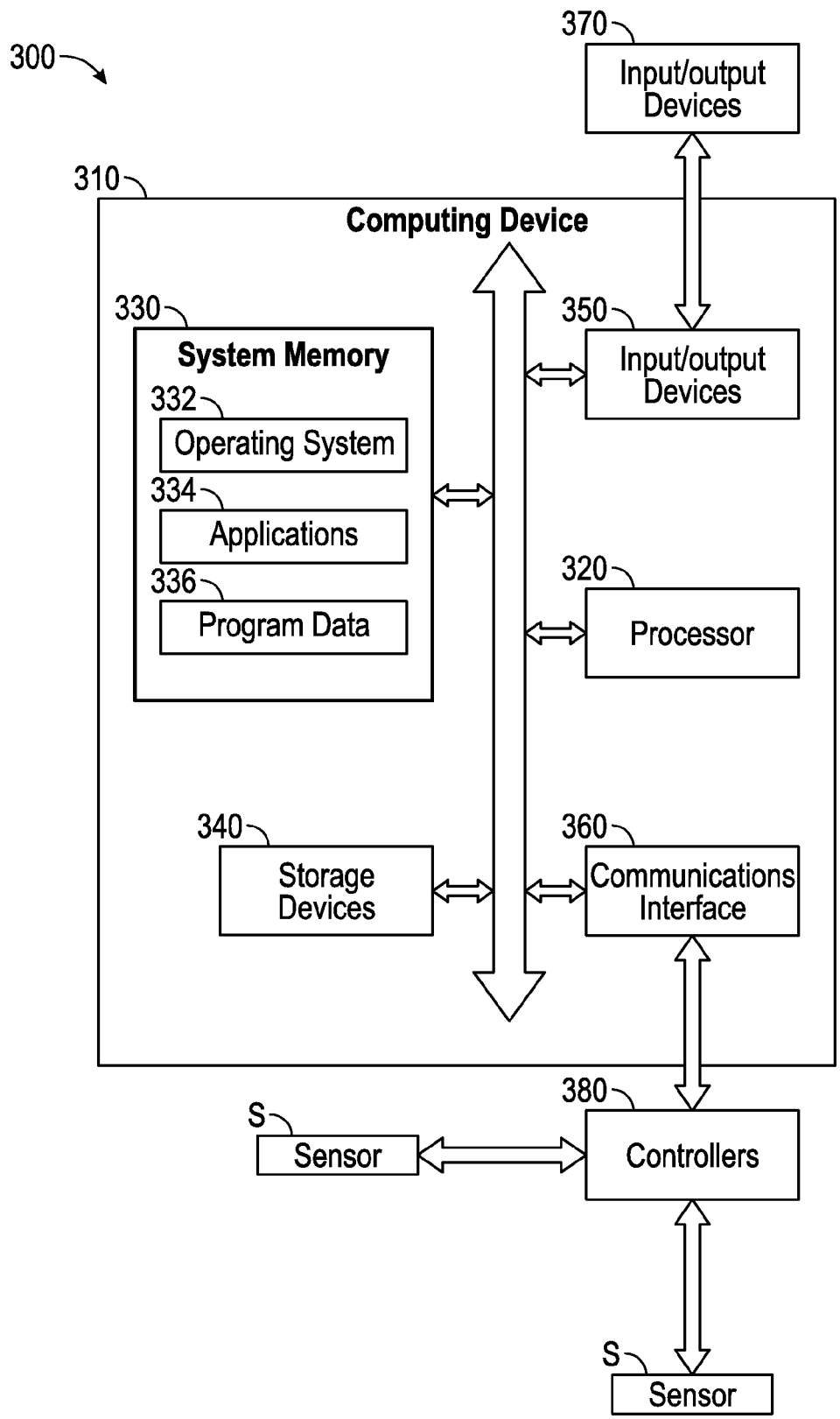
FIG. 4 is an illustration of a block diagram of an exemplary computing environment including a general purpose computing device for supporting embodiments of the present disclosure.

FIG. 4 is an illustration of a block diagram of a computing environment 300 including a general purpose computing device 310 for supporting embodiments of computer-implemented methods and computer-executable program instructions (or code) according to the present disclosure. For example, the computing device 310, or portions thereof, may execute instructions to adaptively encode/decode data in a particular number of bits. The computing device 310, or portions thereof, may further execute instructions according to any of the methods described herein.

The computing device 310 may include a processor 320. The processor 320 may communicate with a system memory 330, one or more storage devices 340, one or more input/output interfaces 350, one or more communications interfaces 360, or a combination thereof. The system memory 330 may include volatile memory devices (e.g., random access memory (RAM) devices), nonvolatile memory devices (e.g., read-only memory (ROM) devices, programmable read-only memory, and flash memory), or both. The system memory 330 may include an operating system 332, which may include a basic/input output system for booting the computing device 310 as well as a full operating system to enable the computing device 310 to interact with users, other programs, and other devices.

The system memory 330 may include one or more computer programs or applications 334 which may be executable by the processor 320. For example, the applications 334 may include instructions executable by the processor 320 to analyze data, perform decision making tasks, and providing deterministic guidance in the distributed ecosystem 10 (FIG. 1). The system memory 330 may include program data 336 usable for controlling the analysis of data. The applications 334 may also be embodied in a computer readable medium having the applications 334 stored therein.

The processor 320 may also communicate with one or more storage devices 340. For example, the one or more storage devices 340 may include nonvolatile storage devices, such as magnetic disks, optical disks, or flash memory devices. The storage devices 340 may include both removable and non-removable memory devices. The storage devices 340 may be configured to store an operating system, images of operating systems, applications, and program data. In a particular embodiment, the memory 330, the storage devices 340, or both, include tangible computer-readable media.

The processor 320 may also communicate with one or more input/output interfaces 350 that enable the computing device 310 to communicate with one or more input/output devices 370 to facilitate user interaction. The input/output interfaces 350 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 370 may include keyboards, pointing devices, displays, speakers, microphones, touch screens, and other devices. The processor 320 may detect interaction events based on user input received via the input/output interfaces 350. Additionally, the processor 320 may send a display to a display device via the input/output interfaces 350.

The processor 320 may communicate with devices or controllers 380 via the one or more communications interfaces 360. The one or more communications interfaces 360 may include wired Ethernet interfaces, IEEE 802 wireless interfaces, other wireless communication interfaces, or other network interfaces. The devices or controllers 380 may include host computers, servers, workstations, and other computing devices. FIG. 4 further illustrates that the devices or controllers 380 may be communicatively coupled to one or more sensors S (e.g., temperature sensors, pressure sensors, etc.).

While the forms of apparatus and methods herein described constitute preferred aspects of this disclosure, it is to be understood that the disclosure is not limited to these precise forms of apparatus and methods, and the changes may be made therein without departing from the scope of the disclosure.

What is claimed is:

1. A distributed ecosystem including an analysis computing resource and a network, the distributed ecosystem comprising:
a plurality of sensors for monitoring characteristics of the distributed ecosystem;
a plurality of localized computing resources that are each in communication with at least one of the plurality of sensors; and
a plurality of gateway controllers each in communication with at least one of the plurality of sensors, a corresponding localized computing resource, and the analysis computing resource, wherein each of the plurality of gateway controllers is assigned to a corresponding zone of operation within the distributed ecosystem, the corresponding zones of operation each including a defined set of sensors and at least one localized computing resource, and wherein each of the corresponding zones of operation are dynamic such that the defined set of sensors and the at least one localized computing resource within each zone of operation changes based on a specific application, the plurality of gateway controllers each including control logic for:
monitoring a corresponding set of sensors for a data transmit function;
determining that the corresponding localized computing resource does not have requisite resource capabilities for processing data generated by the corresponding set of sensors in response to the data transmit function being transmitted by the corresponding set of sensors; and
transmitting the data generated by the corresponding set of sensors over the network to the analysis computing resource in response to determining the corresponding localized computing resource does not have the requisite resource capabilities.

2. The distributed ecosystem of claim 1, wherein determining that the corresponding localized computing resource does not have the requisite resource capabilities is based on a cost of the corresponding localized computing resource analyzing the data generated by the corresponding set of sensors.

3. The distributed ecosystem of claim 1, wherein determining that the corresponding localized computing resource does not have the requisite resource capabilities is based on a risk of the corresponding localized computing resource analyzing the data generated by the corresponding set of sensors.

4. The distributed ecosystem of claim 1, wherein determining that the corresponding localized computing resource does not have the requisite resource capabilities is based on an effect window.

5. The distributed ecosystem of claim 4, wherein the effect window is a set amount of time allotted for performing an analysis of the data generated by the corresponding set of sensors.

6. The distributed ecosystem of claim 1, comprising a centralized computing resource and a remote computing resource that are both in communication with the network.

7. The distributed ecosystem of claim 6, wherein in response to receiving the data generated by the corresponding set of sensors over the network, the analysis computing resource selects the centralized computing resource or the remote computing resource for processing the data generated by the corresponding set of sensors.

8. The distributed ecosystem of claim 1, wherein the data transmit function is based on an exception event occurring, and wherein the exception event indicates the corresponding set of sensors has detected operating conditions within the distributed ecosystem that require analysis.

9. The distributed ecosystem of claim 1, wherein the data transmit function is periodically triggered.

10. The distributed ecosystem of claim 1, wherein the plurality of sensors are used to monitor operating conditions of an aircraft.

11. The distributed ecosystem of claim 1, wherein the corresponding zones of operation are dynamic and determined based on at least one process associated with a unit of work, and wherein unit of work is a predetermined set of tasks relative to defined activities within a respective zone of operation.

12. A method of determining at least one ideal network location for analyzing data, performing decision making tasks, and deterministic guidance in a distributed ecosystem, the method comprising:
assigning a plurality of zones of operation within the distributed ecosystem, wherein each of the plurality of zones of operation includes a corresponding gateway controller, a defined set of sensors, and a corresponding localized computing resource, and wherein each of the plurality of zones of operation are dynamic such that the defined set of sensors and the corresponding localized computing resource within each of the plurality of zones of operation change based on a specific application;
monitoring a corresponding set of sensors by a gateway controller for a data transmit function, wherein the gateway controller is in communication with the corresponding set of sensors, the corresponding localized computing resource, and an analysis computing resource;
determining, by the gateway controller, in response to the data transmit function being transmitted by the corresponding set of sensors, the corresponding localized computing resource does not have requisite resource capabilities for processing data generated by the corresponding set of sensors; and
transmitting, by the gateway controller, in response to determining the corresponding localized computing resource does not have the requisite resource capabilities, the data generated by the corresponding set of sensors over the network to the analysis computing resource.

13. The method of claim 12, wherein determining that the corresponding localized computing resource does not have the requisite resource capabilities is based on a cost of the corresponding localized computing resource analyzing the data generated by the corresponding set of sensors.

14. The method of claim 12, wherein determining that the corresponding localized computing resource does not have the requisite resource capabilities is based on a risk of the corresponding localized computing resource analyzing the data generated by the corresponding set of sensors.

15. The method of claim 12, wherein determining that the corresponding localized computing resource does not have the requisite resource capabilities is based on an effect window.

16. The method of claim 15, wherein the effect window is a set amount of time allotted for performing the analysis of the data generated by the corresponding set of sensors.

17. The method of claim 12, comprising a centralized computing resource and a remote computing resource that are both in communication with the network.

18. The method of claim 17, wherein in response to receiving the data generated by the corresponding set of sensors over the network, the analysis computing resource selects the centralized computing resource or the remote computing resource for processing the data generated by the plurality of sensors.

19. The method of claim 12, wherein the data transmit function is based on an exception event occurring, and wherein the exception event indicates the corresponding set of sensors has detected operating conditions within the distributed ecosystem that require analysis.

20. The method of claim 12, comprising determining the corresponding zones of operation based on at least one process associated with a unit of work, and wherein unit of work is a predetermined set of tasks relative to defined activities within a respective zone of operation.

\* \* \* \* \*